United States Patent
Aoi (10) Patent No.: US 9,016,655 B2
(45) Date of Patent: Apr. 28, 2015

(54) SLIDE RAIL DEVICE FOR VEHICLE

(71) Applicant: Shiroki Corporation, Kanagawa (JP)

(72) Inventor: Hirohito Aoi, Kanagawa (JP)

(73) Assignee: Shiroki Corporation, Kanagawa (JP)

( * ) Notice: Subject to any disclaimer, the term of this patent is extended or adjusted under 35 U.S.C. 154(b) by 0 days.

(21) Appl. No.: 13/780,277

(22) Filed: Feb. 28, 2013

(65) Prior Publication Data

US 2013/0168524 A1 Jul. 4, 2013

Related U.S. Application Data (63) Continuation of application No. PCT/JP2011/064018, filed on Jun. 20, 2011.

(30) Foreign Application Priority Data

Sep. 7, 2010 (JP) .................. 2010-199554

(51) Int. Cl.
  *B60N 2/08* (2006.01)
  *B60N 2/07* (2006.01)
(52) U.S. Cl.
  CPC .............. *B60N 2/0727* (2013.01); *B60N 2/07* (2013.01); *B60N 2/0707* (2013.01); *B60N 2/0705* (2013.01); *B60N 2/0818* (2013.01); *B60N 2/0875* (2013.01); *B60N 2/0881* (2013.01)
(58) Field of Classification Search
  USPC ......... 248/424, 429; 296/65.01, 65.11, 65.13, 296/65.14, 65.15, 65.18; 297/311, 312
  See application file for complete search history.

(56) References Cited

U.S. PATENT DOCUMENTS

| | | | | |
|---|---|---|---|---|
| 6,354,553 | B1 * | 3/2002 | Lagerweij et al. | ............ 248/430 |
| 6,843,532 | B2 * | 1/2005 | Borbe et al. | ............ 297/344.11 |
| 7,506,856 | B2 * | 3/2009 | Ikegaya et al. | ................ 248/430 |
| 7,735,798 | B2 * | 6/2010 | Kojima | .................. 248/429 |
| 7,922,143 | B2 * | 4/2011 | Park et al. | ...................... 248/429 |
| 7,963,496 | B2 * | 6/2011 | Kojima et al. | ................ 248/429 |
| 8,052,113 | B2 * | 11/2011 | Moriyama et al. | ............ 248/430 |

(Continued)

FOREIGN PATENT DOCUMENTS

| | | |
|---|---|---|
| CN | 101505995 A | 8/2009 |
| CN | 101554845 A | 10/2009 |

(Continued)

OTHER PUBLICATIONS

International Search Report for PCT/JP2011/064018 (Jul. 5, 2011).

(Continued)

*Primary Examiner* — Alfred J Wujciak
(74) *Attorney, Agent, or Firm* — Millen, White, Zelano & Branigan, P.C.

(57) ABSTRACT

The present invention achieves a slide rail device for a vehicle in which it is possible to smoothly eject out objects that have fallen into the lower rail by using the upper rail, even if slide-restriction lugs, for restricting the slide position of the upper rail with respect to the lower rail, are formed by being cut and raised, and in which it is possible to reduce deterioration in rigidity of the lower rail.

The solution is a slide rail device including slide-restriction lugs formed on a lower edge of each downward-extending portion of the lower rail by being cut and raised, the slide-restriction lugs superposing the stopper lug of the upper rail in a forward/rearward direction when viewed from the front.

5 Claims, 9 Drawing Sheets

(56) References Cited

U.S. PATENT DOCUMENTS

| | | | |
|---|---|---|---|
| 8,075,038 B2 | 12/2011 | Rohee et al. | |
| 8,146,878 B2* | 4/2012 | Kojima et al. | 248/429 |
| 8,215,602 B2* | 7/2012 | Walter et al. | 248/424 |
| 2002/0179800 A1* | 12/2002 | Flick | 248/429 |
| 2007/0069098 A1* | 3/2007 | Kojima | 248/429 |
| 2008/0048087 A1* | 2/2008 | Kojima et al. | 248/430 |
| 2010/0181460 A1* | 7/2010 | Park et al. | 248/429 |
| 2010/0243853 A1* | 9/2010 | Moriyama et al. | 248/429 |
| 2011/0012005 A1* | 1/2011 | Jahner et al. | 248/429 |
| 2011/0042540 A1* | 2/2011 | Becker et al. | 248/429 |
| 2012/0032058 A1* | 2/2012 | Nihonmatsu et al. | 248/429 |
| 2012/0318948 A1* | 12/2012 | Yamada et al. | 248/429 |

FOREIGN PATENT DOCUMENTS

| | | |
|---|---|---|
| CN | 201423937 Y | 3/2010 |
| CN | 201423938 Y | 3/2010 |
| FR | 2903353 A1 | 1/2008 |
| FR | 2926264 A1 | 7/2009 |
| JP | 2008-179265 A | 8/2008 |
| JP | 2008-254599 A | 10/2008 |
| JP | 2010-36822 A | 2/2010 |
| WO | 2006075815 A1 | 7/2006 |

OTHER PUBLICATIONS

Patent Abstracts of Japan—JP 2008-179265 A (Aug. 7, 2008).
Patent Abstracts of Japan—JP 2008-254599 A (Oct. 23, 2008).
Patent Abstracts of Japan—FR 2926262 A1 (Jul. 17, 2009).
Patent Abstracts of Japan—JP 2010-036822 A (Feb. 18, 2010).
Extended European Search Report dated Jun. 25, 2014 to corresponding European Patent Application No. 11823307.1.
English Abstract for FR2903353, publication dated Jan. 11, 2008.
Faurecia Sieges Automobile; "System Comprising a Motor Vehicle Seat Runner and Body Destined to Be Fixed Thereto, and Method for Making Same"; Espacenet; Aug. 12, 2009; English Abstract of CN101505995 (A).
GSK Corp; "Sliding Rail Structure of Automotive Seat", Espacenet; Oct. 14, 2009; English Abstract of CN101554845 (A).
Faurecia Shanghai Man Co Ltd; "Hand-Operated Sliding Rail mechanism Of Car Seat"; Espacenet; Mar. 17, 2010; English Abstract of CN201423937(Y).
Faurecia Shanghai Man Co Ltd; "Peel Strength Enhancing Device For Sliding Rail Of Car Seat, Seat Sliding Rail And Enhancing Baffle Plate"; Espacenet; Mar. 17, 2010; English Abstract of CN201423938(Y).
Office Action for Chinese Patent Application No. 201180040489.X; Jan. 26, 2015.

* cited by examiner

SLIDE RAIL DEVICE FOR VEHICLE

RELATED APPLICATION DATA

This is a continuation of International Application No. PCT/JP2011/064018, with an international filing date of Jun. 20, 2011, which is herein incorporated by reference in its entirety.

TECHNICAL FIELD

The present invention relates to a slide rail device for a vehicle which supports a seat in a slideable manner.

BACKGROUND ART

Patent Literature 1 is an example of a conventional slide rail device. The slide rail device is equipped with a pair of left and right lower rails extending in a forward/rearward direction which are fixed to a vehicle interior floor, and a pair of left and right upper rails which support the seating portion of a seat and are slideably supported by the left and right lower rails.

A pair of left and right stopper portions are respectively provided, by being cut and raised, near the front end and near the rear end of each upper rail. Whereas, a pair of left and right restricting lugs are provided on each lower rail by being cut and raised. Upon assembling the upper rail onto the lower rail, the restricting lugs are positioned in between the stopper portions.

Therefore, the forward sliding-extremity position of the upper rails (seat) relative to the lower rails is determined by the position of contact of the left and right restricting lugs with the front left and right stoppers, respectively, and the rearward sliding-extremity position thereof is determined by the position of contact of the left and right restricting lugs with the rear left and right stoppers, respectively.

CITATION LIST

Patent Literature

PATENT LITERATURE 1: Japanese Unexamined Patent Publication No. 2008-254599.

SUMMARY OF INVENTION

Technical Problem

For example, if an occupant were to drop a small object such as a lighter, etc., in a state where a front portion or a rear portion of each lower rail is exposed due to the upper rails being positioned at the forward or rearward sliding-extremity positions, such small objects sometimes fall inside the lower rail. In such a case, the upper rails can be slid forwardly or rearwardly from this position to forwardly or rearwardly push out the object by the front end or rear end of the upper rail, in order to externally eject the object from the front end opening or the rear end opening of the lower rail.

However, if restricting lugs are formed across a base-plate portion and a side-wall portion of the lower rail, as in the slide rail device of Patent Literature 1, there is a risk of an object that is pushed by the front end or the rear end of the upper rail getting caught on the restricting lugs and not being able to be ejected from the front-end opening or the rear-end opening of the lower rail.

Furthermore, if restricting lugs are formed across a base-plate portion and a side-wall portion of the lower rail, as in Patent Literature 1, holes are formed at the cut and raised portions of the restricting lugs, and since the sectional shape of the portions of the lower rail in which the cut and raised portions are formed is discontinuous, the rigidity of these portions of the lower rail is deteriorated.

The present invention provides a slide rail device for a vehicle in which it is possible to smoothly eject out objects that have fallen into the lower rail using the upper rail, even if slide-restriction lugs, for restricting the slide position of the upper rail, are formed on the lower rail by being cut and raised, and in which it is possible to reduce deterioration in rigidity of the lower rail.

Solution to Problem

A slide rail device for a vehicle according to the prevent invention is characterized by including a lower rail which is fixed to a vehicle floor and is provided with a bottom wall, outer wall portions which extend upward from left and right edges of the bottom wall, and downward-extending portions which extend downward from inner edges of the outer wall portions and are provided away from the bottom wall and the outer wall portions, the lower rail extending in a forward/rearward direction; and an upper rail which is supported by the lower rail to be slideable in the forward/rearward direction. A stopper lug is provided on the upper rail, and a slide-restriction lug is formed on a lower edge of each the downward-extending portion of the lower rail by being cut and raised, the slide-restriction lug superposing the stopper lug in a forward/rearward direction when viewed from the front.

A plurality of slits can be formed on the lower edge of each the downward-extending portion, the slits extending in an upward direction and arranged in the forward/rearward direction, wherein a portion that is positioned between adjacent the slits is bent to form the slide-restriction lug.

According to such a configuration, the slits are a plurality of lock grooves arranged in the forward/rearward direction at equal-distance intervals, wherein a lock device is provided on the upper rail to be slideable together with the upper rail in the forward/rearward direction relative to the lower rail, and to be movable between a position at which the lock device is engaged with one of the lock grooves and a position at which the lock device is released downward from the lock grooves.

The slide-restriction lug can be cut and raised toward the outer wall portion facing the downward-extending portion, wherein the stopper lug is positioned in a space between the downward-extending portion and the outer wall portion facing thereto.

The slide-restriction lug can be formed at each of the front and at the rear of the lower rail, and the stopper lug is positioned in between the front and rear the slide-restriction lugs.

Advantageous Effects of Invention

According to the present invention, since slide-restriction lugs on the lower rail are formed on the lower ends of the downward-extending portions, there is little chance of an object that has fallen in the lower rail from getting caught with the slide-restriction lugs when being pushed in the forward direction or the rearward direction by the front end or the rear end of the upper rail. Accordingly, an object that has fallen in the lower rail can be smoothly ejected out of the lower rail by using the upper rail.

Furthermore, if the slide-restriction lugs are formed by cutting and raising, notches are formed at positions where the slide-restriction lugs are cut and raised at the lower end of the downward-extending portions. However, since the cross sectional shape of these portions is continuous, the rigidity of these portions is not greatly reduced.

DESCRIPTION OF EMBODIMENTS

An embodiment of the present invention will be hereinafter discussed with reference to FIGS. 1 through 19. Directions described in the following description are defined based on the directions of arrows shown in the drawings.

A slide seat device 10 is installed onto a floor board F (see FIG. 1) that forms a vehicle interior floor of an automobile (vehicle), not shown in the drawings. Four screw holes (two front and rear left holes and two front and rear right holes) F1 are formed through the floor board F for one slide seat device 10, and weld nuts N which are coaxial with the screw holes F1 are fixed to a lower surface of the floor board F at positions corresponding to each screw hole F1, respectively. In addition, positioning holes F2 are formed through the floor board F at positions immediately behind the front screw holes F1, respectively. The slide seat device 10 is provided with a slide rail device 15 that constitutes a lower part of the slide seat device 10, and a seat 11 which is fixed to upper surfaces of the slide rail device 15 (upper rails 35).

The detailed structure of the slide rail device 15 will be discussed hereinafter.

The slide rail device 15 is provided, as large components thereof, with a pair of left and right rail units 20 and a loop handle 70 which connects the front ends of the left and right rail units 20. The left and right rail units 20 have the same structure while the loop handle 70 has a bilaterally-symmetrical shape, and therefore, the slide rail device 15 is bilaterally symmetrical as a whole.

The left and right rail units 20 have a structure which will be discussed hereinafter.

Figure 3:
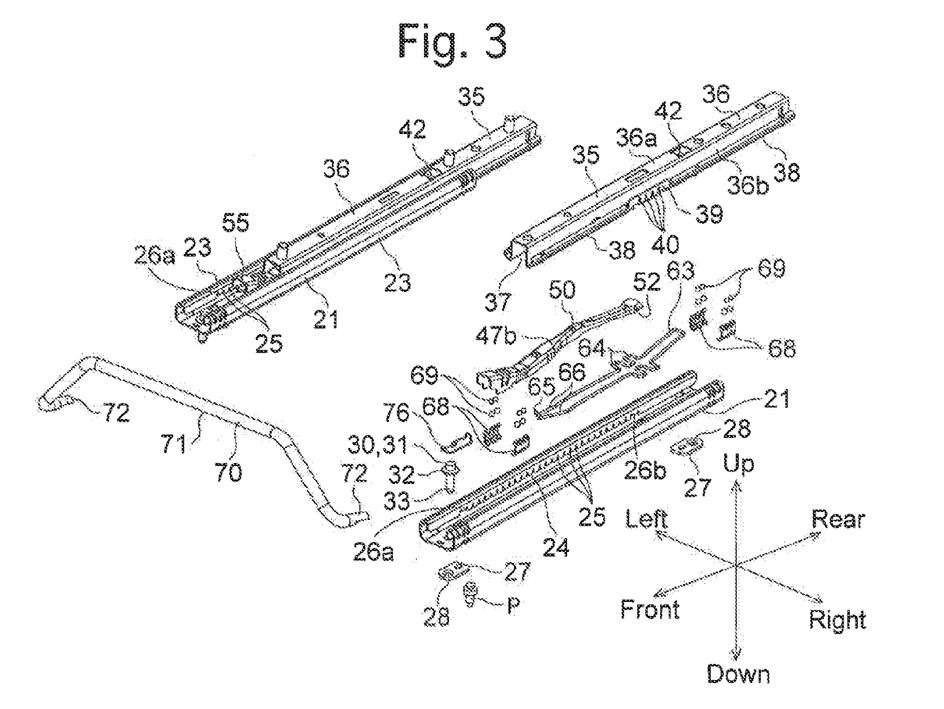
FIG. 3 is an exploded front perspective view of the slide rail device, viewed obliquely from above.
Figure 4:
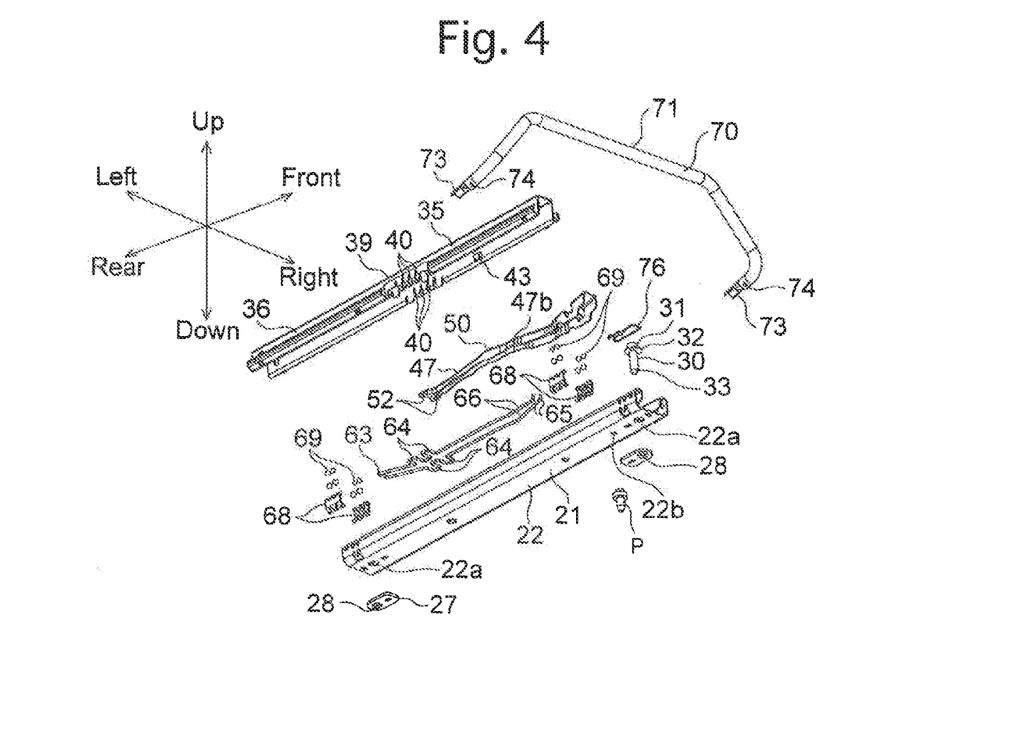
FIG. 4 is an exploded front perspective view of the slide rail device with the left rails omitted, viewed obliquely from below.
Figure 10:
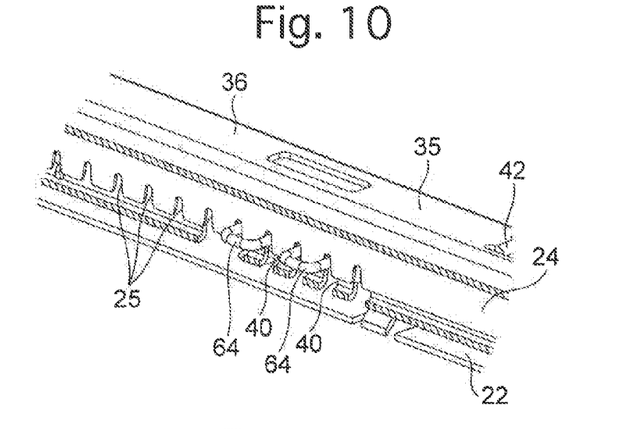
FIG. 10 is an enlarged perspective view of one upper rail and the associated lower rail in a locked state with an outer side wall of the lower rail, an upright wall and a locking wall of the upper rail cut out.

The rail unit 20 is provided with a lower rail 21 which is placed on the floor board F. The lower rail 21 is a metal channel member which extends in the forward/rearward direction and the top thereof is open, and is provided with a substantially-horizontal bottom wall 22, a left and right pair of outer wall portions 23 which extend upward from the left and right sides of the bottom wall 22, respectively, and a pair of left and right downward-extending portions 24 which extend inward and thereafter downward from the top edges of the pair of left and right outer wall portions 23, respectively. As shown in FIGS. 3 and 10, etc., a large number of lock grooves (slits) 25 are formed in the lower edges of the left and right downward-extending portions 24 and are arranged in the forward/rearward direction at equal-distance intervals. In addition, as shown in FIG. 4, a pair of bolt insertion holes 22a are formed through the bottom wall 22 near the front and rear ends of the bottom wall 22, respectively, and a positioning hole 22b is formed through the bottom wall 22 immediately behind the front bolt insertion hole 22a. Spacers 27 are fixed to the undersurface of the bottom wall 22 near front and rear ends thereof, respectively, and through-holes 28 formed through the two spacers 27 are coaxial with the bolt insertion holes 22a, respectively.

A front and rear pair of fixing bolts 30 are inserted into the front and rear bolt insertion holes 22a of the bottom wall 22 from above, respectively. Each fixing bolt 30 is provided with a head 31 which constitutes the upper end of the fixing bolt 30, a flange 32 which is greater in diameter than the head 31 and the associated bolt insertion hole 22a, and is joined to the lower end of the head 31, and a threaded portion 33 which extends downward from a lower surface of the flange 32 and is slightly smaller in diameter than the associated bolt insertion hole 22a and through-hole 28.

Figure 6:
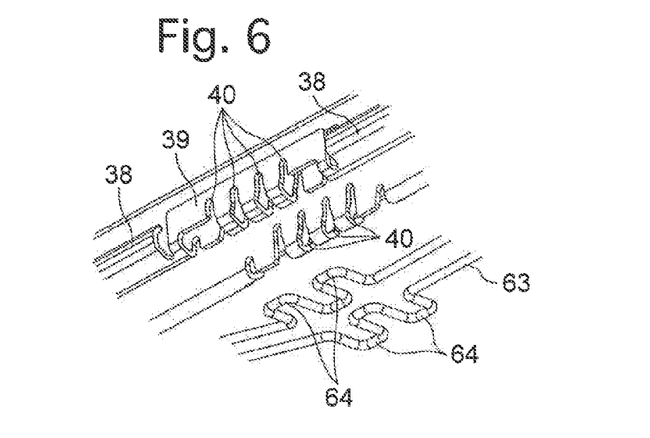
FIG. 6 is an enlarged perspective view of middle parts of one upper rail and a lock spring in a mutually separated state, viewed obliquely from below.
Figure 7:
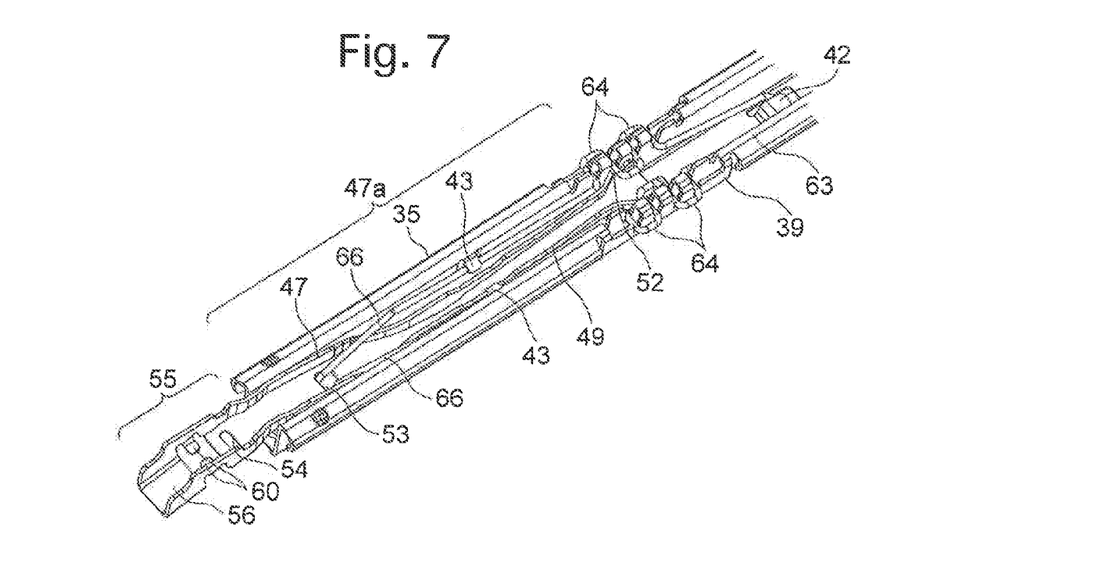
FIG. 7 is a perspective view of one upper rail, a lock-release lever and the lock spring in an assembled state, viewed obliquely from below.

The rail unit 20 is provided with an upper rail 35 that is slideable in the forward/rearward direction with respect to the associated lower rail 21. The upper rail 35 is a metal channel member which extends in the forward/rearward direction and the bottom thereof is open, and is provided with a base 36 (provided with a substantially-horizontal roof portion 36a and a pair of side wall portions 36b which extend downward from both left and right sides of the roof portion 36a) which is substantially inverted U-shaped in cross section and the internal space of which defines a lever accommodating groove 37, upright walls 38 which extend upward from the side wall portions 36b except central portions thereof in the longitudinal direction, and locking walls (stoppers) 39 which extend upward from the aforementioned central portions of the side wall portions 36b. As shown in FIGS. 3, 4, 6 and 19, etc., the left and right locking walls 39 are positioned inward from the upright walls 38 in a front elevational view. As shown in FIGS. 3, 4 and 6, etc., four forward/rearward-movement restricting grooves 40 are formed through the lower edges of the left and right locking walls 39 and the lower edges of the side wall portions 36b of the base 36 and extend upward. In addition, as shown in FIGS. 3 and 7, etc., the base 36 is provided, in the vicinity of a central portion of the roof portion 36a, with a locking lug 42 which is formed by cutting and raising a portion of the base 36 to extend downward and rearward, and is provided, on portions of the left and right side wall portions 36b which are positioned slightly in front of central portions of the left and right side wall portions 36b, with locking lugs 43 which are formed by cutting and raising portions of the left and right side wall portions 36b to extend inward.

Each rail unit 20 is further provided with a lock-release lever 47 and a lock spring (lock device) 63 that are installed in the associated upper rail 35.

The lock-release lever 47 is a press-molded product formed from a metal plate and also a metal channel member which extends in the forward/rearward direction and the bottom thereof is open, and is provided with a base wall 47d and side walls 51 which extend downward from both left and right side edges of the base wall 47d. The lock-release lever 47 has a substantially inverted U-shaped cross section over the length thereof, a portion of the lock-release lever 47 immediately in front of a central portion thereof in the longitudinal direction thereof constitutes a middle portion 48, the internal space of which forms a receptive depressed portion 48a, and a portion of the lock-release lever 47 immediately behind the middle portion 48 is formed as a narrow-width portion 49 which is narrower in width than portions of the lock-release lever 47 positioned in front and behind the narrow-width portion 49. In addition, ridges 47b which are formed on the side surfaces (outer side surfaces in the vicinity of the joint between the middle portion 48 and the narrow-width portion 49) of the left and right side walls 51 to extend in the vertical direction are formed as R-planes (see FIGS. 3, 4, 8, 9 and 13). As shown in FIGS. 3, 4, 8 and 9, a rotational contact protrusion 50 which extends in the leftward/rightward direction protrudes from an upper surface of the lock-release lever 47. In addition, spring-hook grooves 52 are formed on lower surfaces of the left and right side walls 51 of the lock-release lever 47 in the vicinity of the rear ends of the left and right side walls 51, and a lock-spring catching hole 53 and a lock-spring catching hole 54 are formed through the base wall 47d of the lock-release lever 47, respectively. Additionally, ridges 52a substantially identical in shape to the ridges 47b are formed on the left and right side walls 51 immediately in front of the spring-hook grooves 52, respectively (see FIGS. 8, 9 and 13). A portion of the lock-release lever 47 which is positioned in front of the middle portion 48 constitutes a connecting portion 55 that is greater in width than the middle portion 48, and the portion of the lock-release lever 47 which is positioned behind the connecting portion 55 constitutes a rail-incorporated portion 47a. The undersurface of the roof of the front end of the connecting portion 55 is formed as a flat front restricting portion 56, and a space immediately below the front restricting portion 56 constitutes a front allowance space 57. In addition, a depressed portion 58 is formed on the connecting portion 55 at a position immediately behind the front restricting portion 56, and the space created by the depressed portion 58 constitutes a rear allowance space 59. Furthermore, substantially-horizontal rear restricting lugs 60 (the upper surfaces of which constitute rear restricting portions 60a) which extend in directions to approach each other are projected from the left and right lower edges of the depressed portion 58. Furthermore, a combination of the front allowance space 57 and the rear allowance space 59 constitutes a connecting space 61.

The lock spring 63 is a substantially bilaterally-symmetrical member formed by bending a metal wire rod. A pair of front and rear pairs lock portions 64 which extend substantially horizontally outwards are formed on portions of both left and right side portions of the lock spring 63 which are positioned slightly behind central portions thereof in the longitudinal direction, respectively. A portion of the lock spring 63 which is positioned behind the lock portions 64 extends obliquely rearwardly upwards from the lock portions 64 when in a free state, and a portion of the lock spring 63 which is positioned in front of the lock portions 64 extends obliquely forwardly upwards from the lock portions 64 when in a free state. The lock spring 63 is provided at the front end thereof with a pair of left and right front-end locking lugs 65 which project upward, and portions of the lock spring 63 which are positioned immediately behind the front-end locking lugs 65 constitute lever pressing portions 66.

Figure 8:
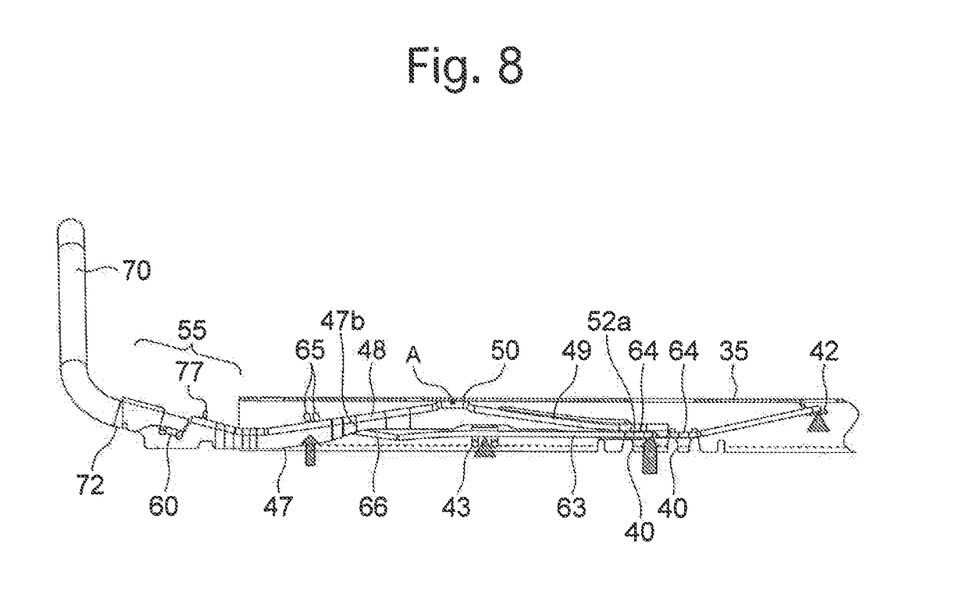
FIG. 8 is a side view of one upper rail, the lock-release lever and a loop handle in a locked state, wherein only the upper rail is shown as a longitudinal sectional side view.
Figure 9:
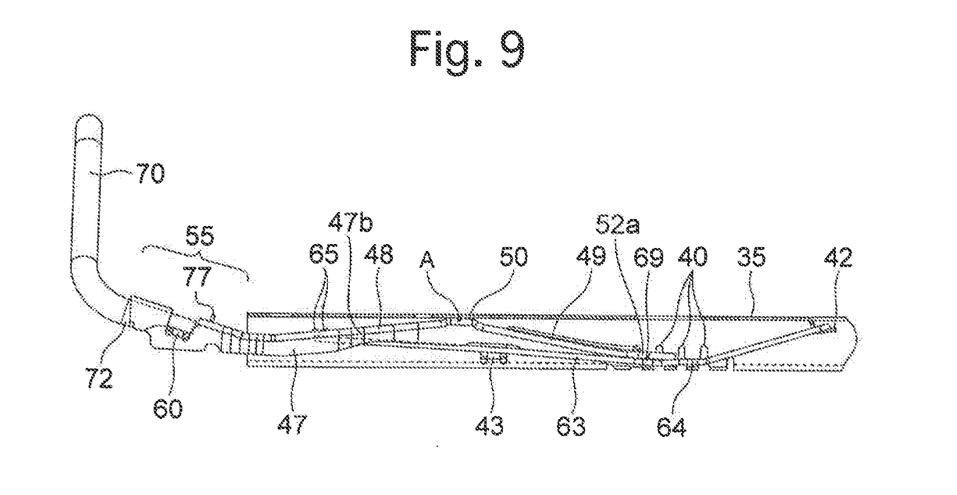
FIG. 9 is a side view similar to that of FIG. 8 in an unlocked state.

The rail-incorporated portion 47a of the lock-release lever 47 is accommodated in the lever accommodating groove 37 of the associated upper rail 35, and the rotational contact protrusion 50 is in contact with a roof surface of the base 36 (see a contact portion "A" in FIGS. 8 and 9; an interspace is formed between the upper surface of the rail-incorporated portion 47a except the rotational contact protrusion 50 and a roof surface of the lever accommodation groove 37). As shown in FIGS. 7 through 9, the rear end of the lock spring 63 is lock-engaged with the locking lug 42 (see the triangular mark in FIG. 8), portions of the lock spring 63 which are slightly in front of the lock portions 64 are lock-engaged with the left and right locking lugs 43 (see the triangular mark in FIG. 8), each lock portion 64 is lock-engaged with the associated forward/rearward-movement restricting groove 40 from below, and the pair of left and right front-end locking lugs 65 are inserted into the lock-spring catching hole 53 from below. Moreover, portions of the left and right lever pressing portions 66 in the vicinity of the front ends thereof are lock-engaged with the rear edge of the lock-spring catching hole 53, and the spring-hook grooves 52 are lock-engaged from above with portions of the lock spring 63 which are positioned between the pair of lock portions 64. Installation of the lock spring 63 to the upper rail 35 and lock-release lever 47 in this manner puts the lock spring 63 in a substantially restricted state (where the locking engagement between the rear end of the lock spring 63 and the locking lug 42 is not released and where the front-end locking lugs 65 can move within a minute moving range in which the front-end locking lugs 65 are prevented from coming out of the lock-spring catching hole 53 with respect to the upper rail 35, or the front-end locking lugs 65 are completely prevented from moving in the forward/rearward direction), and left and right portions (front half portions) of the lock spring 63 are respectively positioned in a pair of left and right spaces formed between the side walls 51 of the narrow-width portion 49 and the pair of side wall portions 36b of the upper rail 35 (see FIG. 7). In addition, the lock spring 63 that is accommodated in the lever accommodation groove 37 produces an upward biasing force (elastic force) by being elastically deformed (see arrows f shown in FIG. 8), and accordingly, this biasing force causes the rotational contact protrusion 50 of the lock-release lever 47 to be pressed against the roof portion 36a of the base 36, which allows the lock-release lever 47 to rotate about the rotational contact protrusion 50 (about an imaginary rotational axis extending in the leftward/rightward direction) about the contact portion A between the roof portion 36a and the rotational contact protrusion 50, and the lock-release lever 47 is held in the locked position shown in FIG. 8 when no upward external force is exerted on the connecting portion 55. On the other hand, exerting an upward external force on the connecting portion 55 against the biasing force of the lock spring 63 causes the lock lever 47 to rotate to the unlocked position shown in FIG. 9. Thereupon, as shown in FIG. 9, the spring-hook grooves 52 of the lock-release lever 47 depresses the portions of the lock spring 63 which are positioned between the pair of lock portions 64, so that each lock portion 64 moves downward from the associated guide groove 40 (see FIG. 9, and the phantom line shown in 11).

Figure 5:
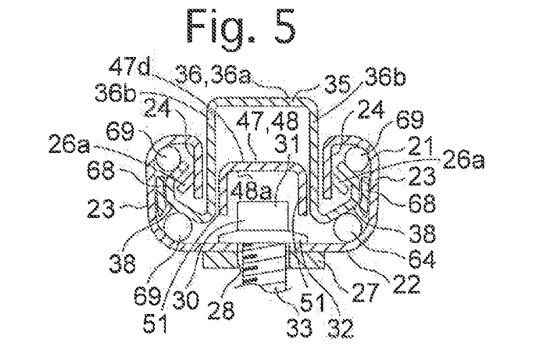
FIG. 5 is a sectional view taken along the line V-V shown in FIG. 1.

An assembly made by inserting a combination of one upper rail 35, one lock release lever 47 and one lock spring 63, which are combined together in the above described manner, into one lower rail 21 from the front or rear end opening of the lower rail 21 constitutes one rail unit 20. When a rail unit 20 is assembled, the upright walls 38 and the locking walls 39 of the upper rail 35 enter the spaces formed between the outer wall portions 23 and the downward-extending portions 24, as shown in FIGS. 5 and 9, and a plurality of bearing balls 69, which are rotatably supported by retainers 68 installed in the above-mentioned spaces, are in rotatable contact with both outer surfaces of the upright walls 38 and inner surfaces of the outer wall portions 23, which allows the upper rail 35 (and the lock release lever 47 and the lock spring 63) to slide in the forward/rearward direction with respect to the lower rail 21.

Figure 18:
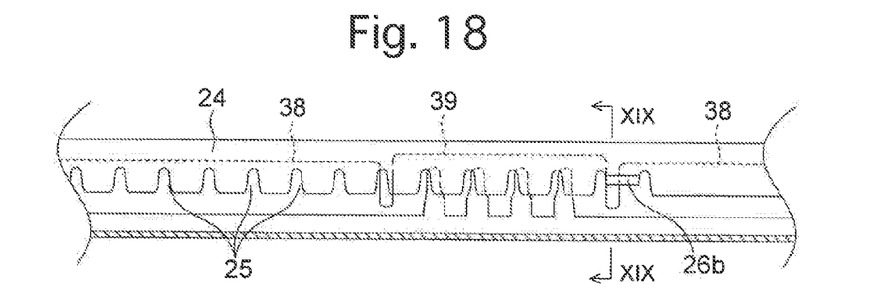
FIG. 18 is a sectional view taken along the line XVIII-XVIII shown in FIG. 2.
Figure 19:
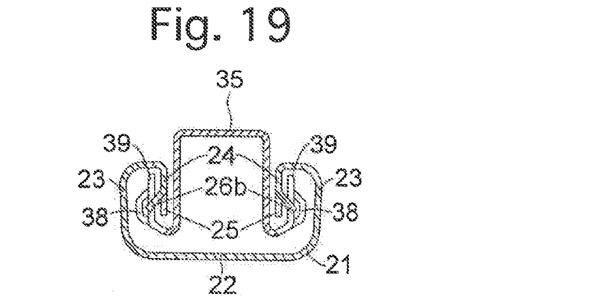
FIG. 19 is a sectional view taken along the line XIX-XIX shown in FIG. 18.

When the rail unit 20 is assembled, a pair of left and right slide-restriction lugs 26a are formed by bending portions positioned between the lock groove 25 at the front end of each left and right downward-extending portion 24 of the lower rail 21 and the lock groove 25 positioned immediately behind the associated front-end lock groove 25 outwards with respect to the lower rail 21, and a pair of left and right slide-restriction lugs 26b are formed by bending portions positioned between the lock groove 25 at the rear end and the lock groove 25 positioned immediately in front of the associated rear-end lock groove 25 outwards with respect to the lower rail 21. Accordingly, as shown in FIGS. 18 and 19, the left locking wall 39 is positioned between the left slide-restriction lug 26a and the slide-restriction lug 26b when viewed from the front (so as to superpose in the forward/rearward direction), and the right locking wall 39 is positioned between the right slide-restriction lug 26a and the slide-restriction lug 26b when viewed from the front (so as to superpose in the forward/rearward direction).

Figure 11:
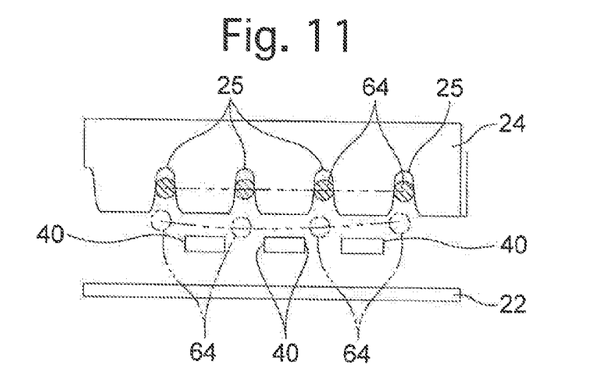
FIG. 11 is a schematic side view showing a state where a lock spring is in a locked position and a state where the same lock spring is in an unlocked position.

In addition, when the lock release lever 47 is in the locked position, the upper rail 35 is prevented from sliding with respect to the lower rail 21 because each lock portion 64 is engaged with the associated forward/rearward-movement restricting groove 40 and lock groove 25 from below as shown by solid lines in FIGS. 8, 10 and 11. On the other hand, rotating the lock release lever 47 down to the unlocked position causes each lock portion 64 which was engaged with some of the lock grooves 25 to be disengaged downward therefrom, as shown in FIG. 9 and by the phantom lines in FIG. 11, which allows the upper rails 35 to be slideable with respect to the lower rails 21.

The pair of left and right rail units 20 thus assembled are made to be parallel to each other and the positions thereof in the forward/rearward direction are made to coincide with each other (the sliding positions of the upper rails 35 with respect to the lower rails 21 are also made to coincide with each other); thereafter, the lower surface of the seating portion of the seat 11 is mounted on the top surfaces of the upper rails 35, and the seating portion of the seat 11 is fixed to the left and right upper rails 35 by a plurality of bolts, not shown in the drawings.

After the left and right rail units 20 and the seat 11 are integrated in this manner, a loop handle 70 is connected to the left and right lock release levers 47 using torsion springs 76.

The loop handle 70 is a member made by bending a metal pipe having a circular shape in cross section and is provided with a grip portion 71 and a pair of rear-end connecting portions 72, wherein the grip portion 71 includes a linear portion extending in the leftward/rightward direction and a pair of oblique portions extending obliquely rearwardly downward from both left and right ends of the linear portion while the pair of rear-end connecting portions 72 extend rearward from both left and right ends of the grip portion 71. Depressed portions are formed on the lower surfaces of the left and right rear-end connecting portions 72, and the top surfaces in the depressed portions are formed as lower contact surfaces 73. In addition, lock-engaging grooves 74, which are positioned immediately in front of the lower contact surfaces 73 and extend in the leftward/rightward direction, are formed on the lower surfaces of the rear-end connecting portions 72.

Each torsion spring 76 is a substantially bilaterally-symmetrical member made by bending a metal wire rod. An upwardly projecting lug 77 is provided on the rear end of the torsion spring 76, and the front edge of the torsion spring 76 is formed as a front locking portion 78 which extends in the leftward/rightward direction. In addition, a locking projection 79 which projects upward is projected from the rear end of a front half of a side portion of the torsion spring 76, and a locking projection 80 which projects downward is projected from the front end of a rear half of the side portion.

Figure 12:
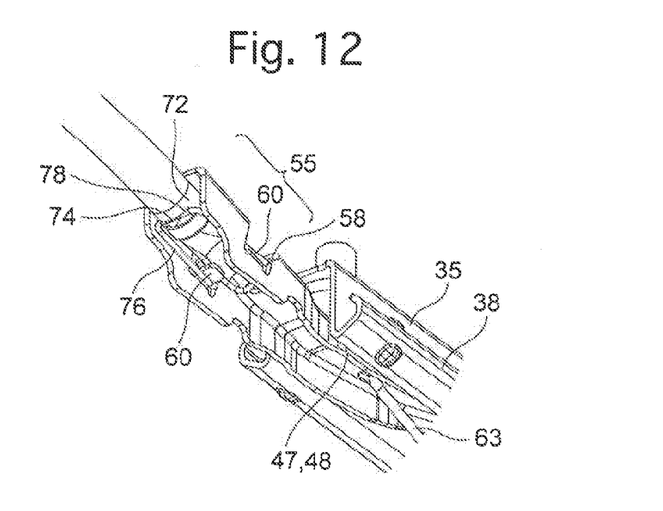
FIG. 12 is an enlarged perspective view of the front ends of one upper rail and the associated lock-release lever, and a rear end of the loop handle, viewed from below.
Figure 13:
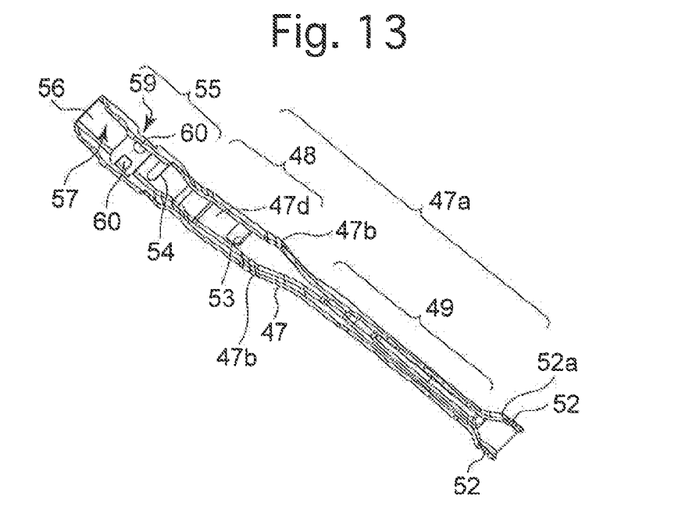
FIG. 13 is a perspective view of one lock-release lever, viewed from below.
Figure 14:
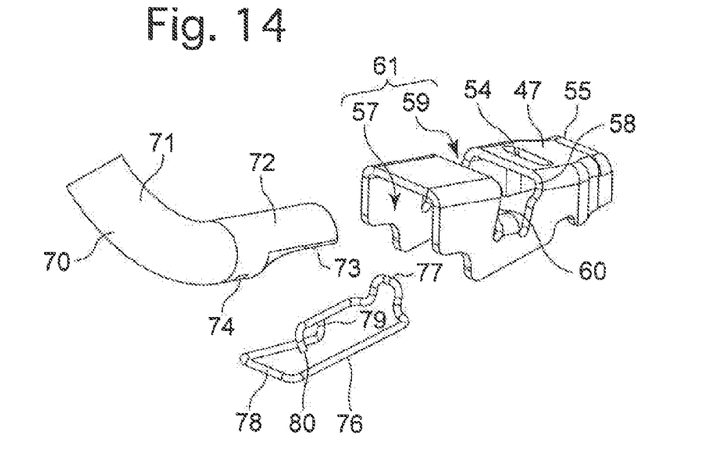
FIG. 14 is an enlarged exploded perspective view of the front end of one lock-release lever, a biasing spring and a rear end of the loop handle.
Figure 15:
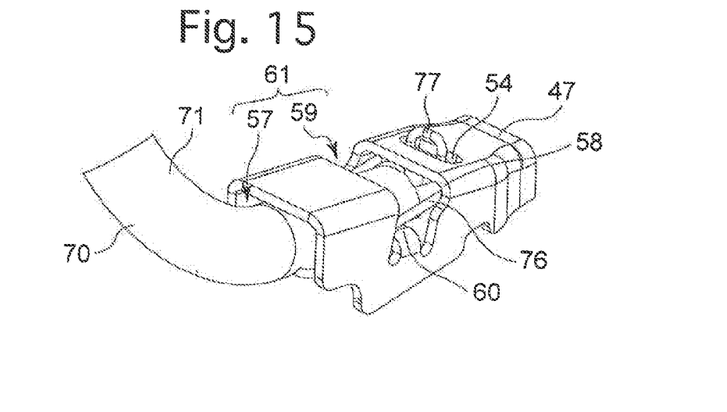
FIG. 15 is an enlarged perspective view of the front end of one lock-release lever, the biasing spring and a rear end of the loop handle in a mutually combined state.

To connect the loop handle 70 and the torsion springs 76 to the lock release levers 47, first the torsion springs 76 are inserted into the connecting spaces 61 of the left and right lock release levers 47, respectively, the torsion springs 76 are prevented from moving in the forward/rearward direction with respect to the connecting portions 55 by insertion of the upwardly projecting lugs 77 into the spring locking holes 54 from below, respectively; furthermore, a middle portion of a side part (the right-hand side part of one torsion spring 76 in the case of the right torsion spring 76, and the left-hand side part of one torsion spring 76 in the case of the left torsion spring 76) of one torsion spring 76 is mounted on the top surface (the rear restricting portion 60a) of one rear restricting lug 60 (the right-hand side rear restricting lug 60 in the case of the right connecting portion 55, and the left-hand side rear restricting lug 60 in the case of the left connecting portion 55), and the locking projection 79 of the other side part (the left-hand side part of one torsion spring 76 in the case of the right torsion spring 76, and the right-hand side part of one torsion spring 76 in the case of the left torsion spring 76) is lock-engaged with the rear edge of the other rear restricting lug 60 (the left-hand side rear restricting lug 60 in the case of the right connecting portion 55, and the right-hand side rear restricting lug 60 in the case of the left connecting portion 55) from below while the locking projection 80 of the other side part is lock-engaged with the front edge of the other rear restricting lug 60 from above (see FIGS. 12, 14 and 15). Subsequently, the left and right rear-end connecting portions 72 of the loop handle 70 are inserted into the left and right connecting spaces 61 from the front, respectively, the rear of each rear-end connecting portion 72 is inserted into the space between the left and right side parts of the associated torsion spring 76, and the lock-engaging grooves 74 are lock-engaged with the front locking portions 78.

Figure 16:
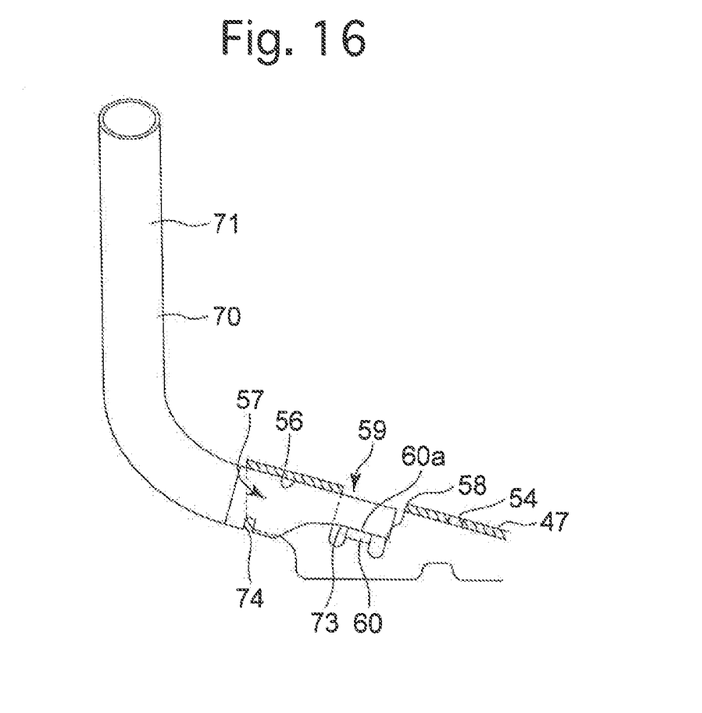
FIG. 16 is an enlarged longitudinal sectional side view of a rear end of the loop handle and the front end of the associated lock-release lever with the biasing spring omitted.
Figure 17:
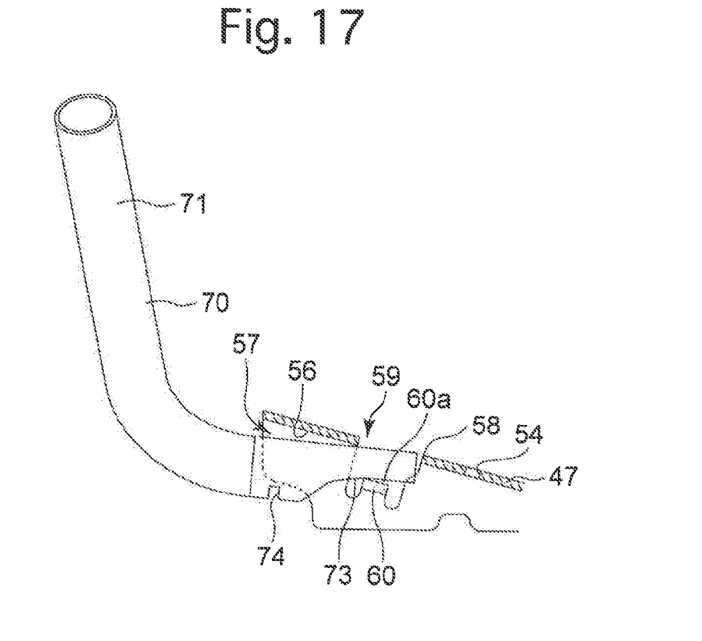
FIG. 17 is a view similar to that of FIG. 16 when the loop handle is depressed downwards.

Upon the slide seat device 10 being assembled by combining the loop handle 70 and the torsion springs 76 with the left and right rail units 20, the front of each torsion spring 76 (portions thereof in front of the rear restricting lugs 60) are slightly resiliently-deformed downward by the rear-end connecting portions 72, and accordingly, an upward biasing force (elastic force) produced by the front of each torsion spring 76 causes the front of each top surface of the rear-end connecting portions 72 to come in contact with the front restricting portions 56 and causes the lower contact surfaces 73 to come in contact with the rear restricting portions 60a of the left and right rear restricting lugs 60 (see FIG. 16). If an occupant manually holds the grip portion and rotates the entire loop handle 70 upward by hand after the loop handle 70 is connected to the left and right lock release levers 47 (the connecting portions 55), this rotational force is exerted on the front restricting portions 56 and the rear restricting portions 60a from the rear-end connecting portions 72 to rotate the lock release levers 47 (the connecting portions 55) upward with the rear-end connecting portions 72, so that the lock release levers 47 in the locked position can be rotated to the unlocked position. On the other hand, rotating the entire loop handle 70 downward causes the left and right rear-end connecting portions 72 to rotate with engaging portions thereof with the front locking portions 78 as fulcrums (causes the rear portions of the rear-end connecting portions 72 to rotate upward in the rear allowance spaces 59 and causes the fronts of the rear-end connecting portions 72 to rotate downward in the front allowance spaces 57) to move away from the front restricting portions 56 and the rear restricting portions 60a, respectively (see FIG. 17), and therefore, this rotational force is not transmitted from each rear-end connecting portion 72 to the associated lock release lever 47 (the connecting portion 55 thereof) (neither the left or right lock release levers 47 rotate).

Figure 1:
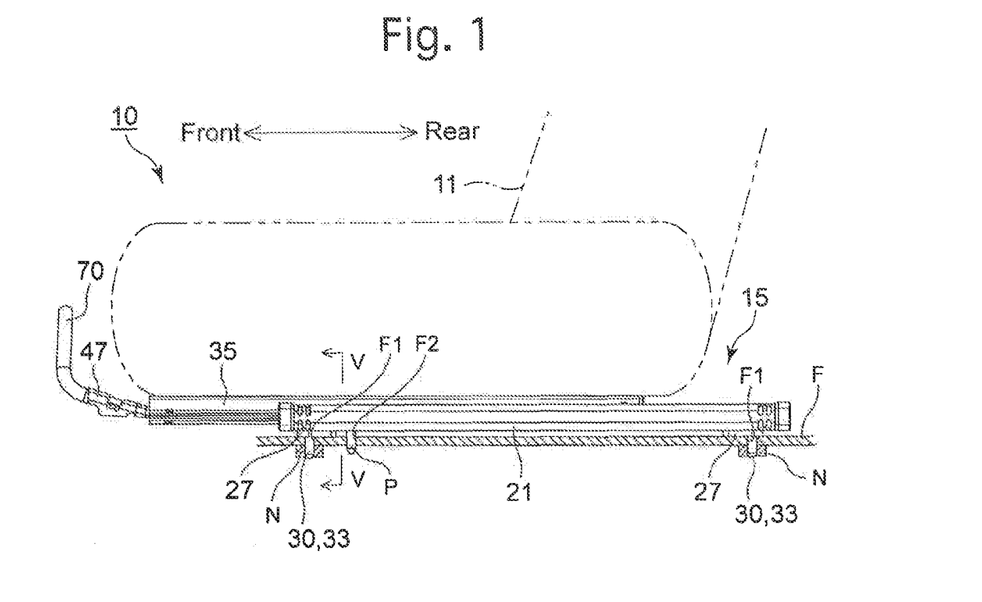
FIG. 1 is a side view of a slide seat device when upper rails of an embodiment of the present invention have slid to the front end position.

After fitting the lower halves of the positioning pins P, shown in FIGS. 1, 3 and 4, into the positioning holes F2 of the floor board F, the positioning holes 22b of the left and right lower rails 21 of the slide seat device 10 are respectively fitted onto the tops of the positioning pins P which project upward from the floor board F, thereby causing the undersurfaces of the spacers 27 that are fixed to the left and right lower rails 21 to come into contact with upper surfaces of the floor board F and causes each bolt insertion hole 22a and each through-hole 28 to be positioned immediately above the associated screw hole F1. Accordingly, the slide seat device 10 is fixed to the floor board F upon each threaded portion 33 being screw-engaged into the associated screw hole F1 until the lower surfaces of the heads 31 of the fixing bolts 30 come into pressing contact with an upper surface of the bottom wall 22.

Figure 2:
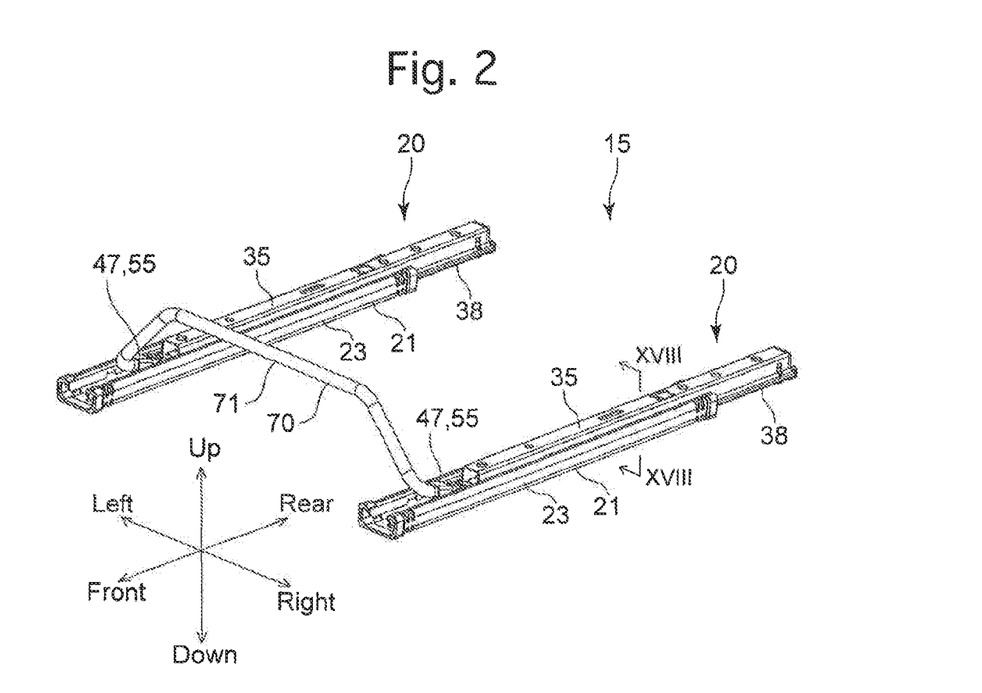
FIG. 2 is a front perspective view of the slide rail device, viewed obliquely from above when the upper rails have slid to the rear end position.

FIGS. 18 and 19 show the slide rail device 10 when the upper rails 35 have been slid to the rear end position shown in FIG. 2. As can be understood from these drawings, the upper rails 35 are restricted from moving any further rearward due to the rear end surfaces of the left and right locking walls abutting the front surfaces of the left and right slide-restriction lugs 26b.

Similarly, when the upper rails 35 have been slid to the front end position shown in FIG. 1, the upper rails 35 are restricted from moving any further forward due to the front end surfaces of the left and right locking walls 39 abutting against the rear surfaces of the left and right slide-restriction lugs 26a.

When an occupant drops a small object, such as a lighter, etc., into a lower rail 21 in a state where the upper rails 35 are positioned at the forward or rearward slide-end position so that the upper side openings of the front or rear portions of the lower rails 21 are exposed, this object can be externally ejected from the front end opening or the rear end opening of the lower rail 21 by the front end or the rear end of the associated upper rail 35 pushing the object forwardly or rearwardly. However, if a slide-restriction lug were to be formed on the bottom wall 22, the object that is pushed by the upper rail 35 would get caught on the slide-restriction lug, so that there is a risk of the object not being ejected from the front opening or the rear opening of the lower rail 21. However, since the slide-restriction lugs 26a and 26b of the illustrated embodiment are formed on the downward-extending portions 24, the slide-restriction lugs 26a and 26b are positioned upwardly away from the bottom wall 22 of the lower rail 21; moreover, since the slide-restriction lugs 26a and 26b are positioned in a narrow space (a space into which a lighter, etc., cannot easily enter into) between the outer wall portions 23 and the downward-extending portions 24, there is little chance of such an object that is pushed by the upper rail 35 of getting caught on the slide-restriction lugs 26a and 26b, so that the object that has been dropped into the lower rail 21 can be smoothly ejected therefrom.

Furthermore, although a lock groove 25 remains on the front and rear sides of the slide-restriction lugs 26a and 26b, since the cross sectional shape of the lower rail 21 at the portions at which such front and rear lock grooves 25 are formed is a continuous shape, the rigidity of the lower rail 21 is not greatly reduced thereat.

Furthermore, since the lock grooves 25, which are formed as grooves for engagement with the lock spring 63 (lock portions 64), are utilized to form the slide-restriction lugs 26a and 26b (by cutting and raising), forming the slide-restriction lugs 26a and 26b is easy compared to the case in which the slide-restriction lugs 26a and 26b, which are different from the lock grooves 25, are formed by being cut and raised.

Moreover, since a large number of lock grooves 25 are formed on the lower rail 21 arranged in the forward/rearward direction, it is possible to select the positions at which the slide-restriction lugs 26a and 26b are formed, and the movable range of the upper rail 35 in the forward/rearward direction can be adjusted by changing the positions of the slide-restriction lugs 26a and 26b.

Furthermore, since a rotational shaft for rotatably supporting the lock-release lever 47 is not provided on the upper rail 35, the rotational support structure of the lock-release lever 47 on the upper rail 35 has a small number of components and is also simple in structure.

Additionally, the rotational support structure for the loop handle 70 (the rear-end connecting portions 72) with respect to the connecting portions 55 also has a small number of components and has a simple structure because the connecting portions 55 of the lock release levers 47 are also not provided with rotational shafts for rotatably supporting the rear-end connecting portions 72 of the loop handle 70.

Although the present invention has been described using the illustrated embodiment, the present invention can be implemented while making various modifications thereto.

Figure 20:
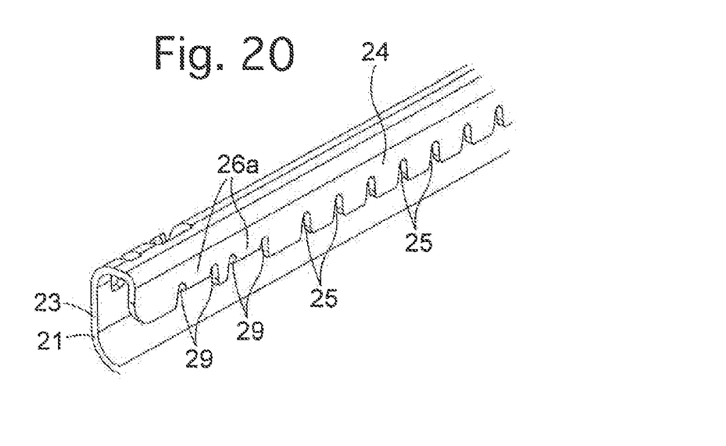
FIG. 20 is an enlarged perspective view of a main part of a modified embodiment of one lower rail.

In a modified embodiment shown in FIG. 20, four (two pairs of) slits 29, which are different from the lock grooves 25 (having different intervals in the forward/rearward direction from the lock grooves 25), are formed in the vicinity of the front and rear ends of the lower edge portions of the downward-extending portions 24 (the rear-end slits 29 are omitted in FIG. 20, though having the same structure as that of the front-end slits 29), and the portions that are between each two adjacent slits 29 are bent outwards to form the two slide-restriction lugs 26a and 26b. According to this modified embodiment, even if the rear slide-restriction lugs 26a or the front slide-restriction lugs 26b were to deform or break by repeatedly colliding, etc., with the locking walls 39, since the sliding of the locking walls 39 (upper rail 35) can be restricted by the front slide-restriction lugs 26a and the rear slide-restriction lugs 26b, the safety thereof is improved.

Furthermore, five or more slits 29, which are different from the lock grooves 25, can be formed near the front and rear ends of the downward-extending portions 24, and one or more than two slide-restriction lugs 26a and 26b can be formed near the front and rear ends of the downward-extending portions 24. Furthermore, by utilizing the lock grooves 25, two or more slide-restriction lugs 26a and 26b can be formed near the front and rear ends of the downward-extending portions 24.

Figure 21:
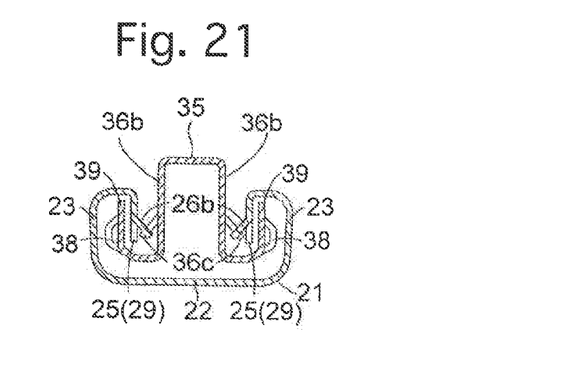
FIG. 21 is a sectional view similar to that of FIG. 19 of another modified embodiment.

Furthermore, as shown in FIG. 21, the slide-restriction lugs 26a and 26b can be formed to face inwardly. In such a case, as shown in FIG. 21, for example, the side wall portions 36b are cut and raised to form abutting lugs 36c, so that the slide-restriction lugs 26a and 26b are made to abut the abutting lugs 36c.

Figure 22:
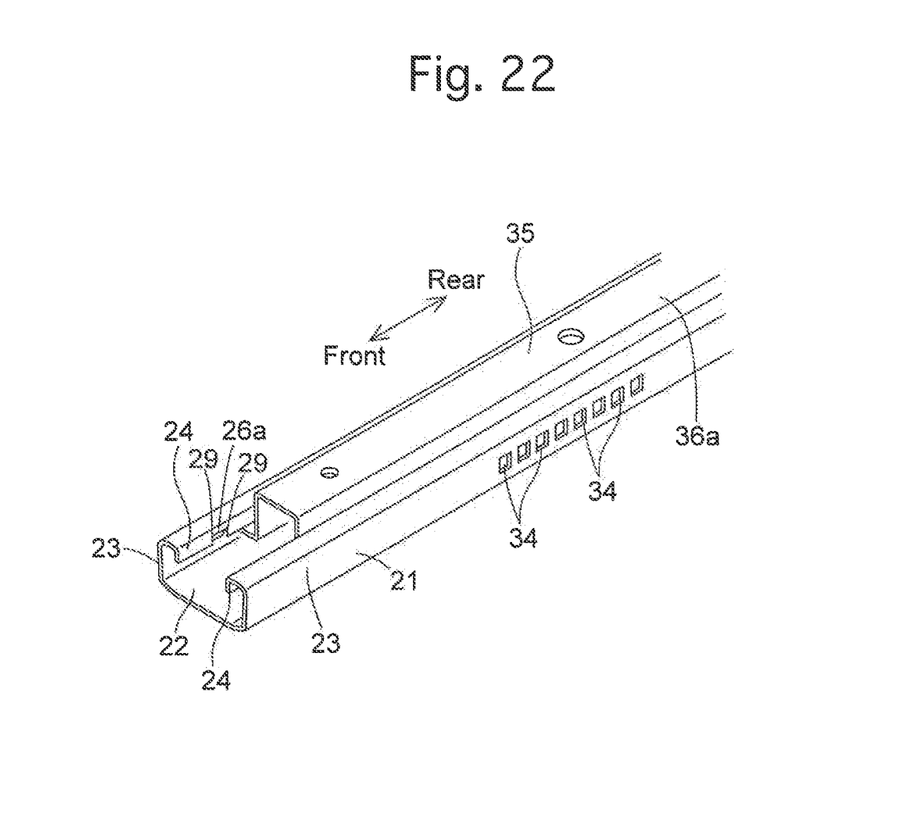
FIG. 22 is a perspective view of one lower rail, one upper rail and a lock mechanism of yet another modified embodiment.
Figure 23:
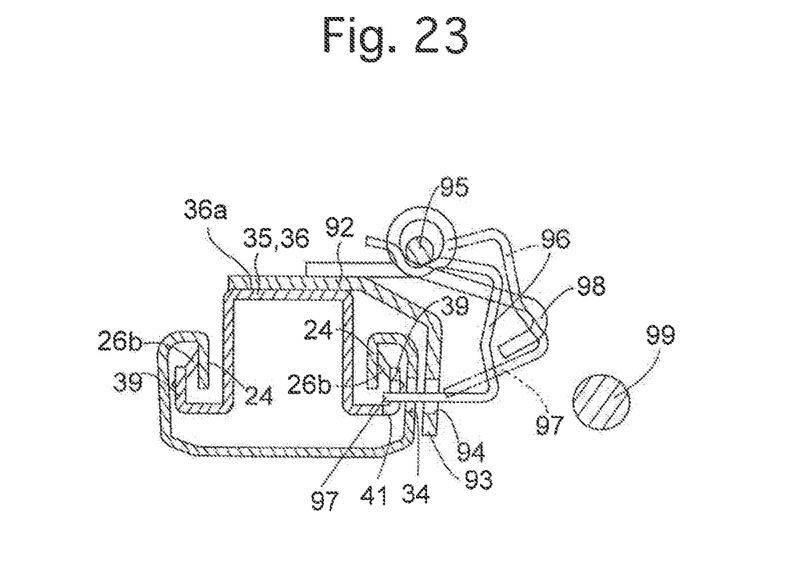
FIG. 23 is a sectional view of the lower rail, the upper rail and the lock mechanism of FIG. 22.

FIGS. 22 and 23 show another modified embodiment. In this modified embodiment, a lock mechanism having a known structure that is positioned an outer side of the rail unit 20 is employed.

Lock grooves 25 are not formed on the downward-extending portions 24 of the lower rail 21 in this modified embodiment, and slide-restriction lugs 26a and 26b are formed between a pair of slits 29, which are formed in the vicinities of the front and rear ends of the downward-extending portions 24, and are bent outwards. Furthermore, a large number of lock holes 34, which are through-holes, are formed through the right outer wall portion 23 and are arranged on the forward/rearward direction.

The forward/rearward-movement restricting grooves 40 are not formed in the locking walls 39 of the upper rail 35; rather, lock-engagement holes 41, which are through-holes, are formed through one of the locking walls 39, instead. Furthermore, a lock-support base plate 92 is fixed to the roof portion 36a of the upper rail 35, and insertion through-holes 94 which face the lock-engagement holes 41 in the leftward/rightward direction is formed through a downward-extending portion 93 which extends downward from a side portion of the lock-support base plate 92. A lock member 96, which is rotatable about a rotational shaft 95 and provided with locking-claws 97 at an end thereof, is attached onto the upper surface of the lock-support base plate 92 via the rotational shaft 95, which extends in the forward/rearward direction. The lock member 96 is rotatable about the rotational shaft 95 between an engaged position shown by solid lines in FIG. 23 and a disengaged position shown by phantom lines in FIG. 23, and is rotatably biased toward the engaged position by the rotational biasing force of a helical torsion spring 98 provided around the rotational shaft 95. When the lock member 96 is positioned at the engaged position, since the locking-claws 97 are fitted into the insertion through-holes 94, lock-engagement holes 41 and the lock holes 34 facing thereto, the sliding of the upper rail 35 with respect to the lower rail 21 is restricted. Whereas, when the lock member 96 is positioned at the disengaged position, since the locking-claws 97 escape outwardly from the insertion through-holes 94, the lock-engagement holes 41, and the lock holes 34 facing thereto, the restriction of the sliding of the upper rail 35 with respect to the lower rail 21 is released. Furthermore, an operation handle 99 which extends in the forward/rearward direction is rotatably supported on a side portion of the upper rail 35 about a rotational axis in the forward/rearward direction, via a rotational support device that is not shown in the drawings, between a locked position and an unlocked position, and is biased toward the locked position via a biaser that is not shown in the drawings. The operation handle 99 is interconnected with the lock member 96, so that when the operation handle 99 is positioned at the locked position, the lock member 96 is positioned at the engagement position, and when the operation handle 99 is positioned at the unlocked position, the lock member 96 is positioned at the disengaged position.

Hence, the forward/rearward sliding-extremity position of the upper rail 35 can be restricted using the slide-restriction lugs 26a, 26b and the locking walls 39 even in the case where such a lock mechanism is employed.

Furthermore, the forward/rearward sliding-extremity position of the upper rail 35 can be restricted by forming stopper lugs, having a shape different from that of the locking walls 39, on the upper rail 35 and making these stopper lugs come into contact with the slide-restriction lugs 26a and 26b.

INDUSTRIAL APPLICABILITY

In the slide rail device for vehicle according to the present invention, when the front end or rear end of the upper rail pushes forwardly or rearwardly an object that has been dropped into a lower rail, there is little chance of such an object of getting caught on the slide-restriction lugs. Accordingly, the object that has been dropped into the lower rail can be smoothly ejected out from the lower rail using the upper rail.

REFERENCE SIGNS LIST

10 Slide seat device
11 Seat
15 Slide rail device
20 Rail unit
21 Lower rail
22 Bottom wall
22a Bolt insertion hole
22b Positioning hole
23 Outer wall portion
24 Downward-extending portions
25 Lock grooves (slits)
26a 26b Slide-restriction lugs
27 Spacer
28 Through-hole
29 Slits
30 Fixing bolt
31 Head
32 Flange
33 Threaded portion
34 Lock holes
35 Upper rail
36 Base 36a Roof portion
36b Side wall portion
36c Abutting lugs
37 Lever accommodating groove
38 Upright wall
39 Locking wall (stopper lug)
40 Forward/rearward-movement restricting grooves
41 Lock-engagement holes
42 43 Locking lug
47 Lock release lever
47a Rail-incorporated portion
47b Ridge
47c Rib
47d Base wall
48 Middle portion
48a Receptive depressed portion
49 Narrow-width portion
50 Rotational contact protrusion
51 Side wall
52 Spring-hook groove
52b Ridge
53 Lock-spring catching hole
54 Spring locking hole
55 Connecting portion
56 Front restricting portion
57 Front allowance space
58 Depressed portion
59 Rear allowance space
60 Rear restricting lug
60a Rear restricting portion
61 Connecting space
63 Lock spring (lock biaser)
64 Lock portion
65 Front-end locking lug
66 Lever pressing portion
68 Retainer
69 Bearing ball
70 Loop handle
71 Grip portion
72 Rear-end connecting portion
73 Lower contact surface
74 Lock-engaging groove
76 Torsion spring
77 Upwardly projecting lug
78 Front locking portion
79 80 Locking projection
85 Lock release lever
90 Lock release lever
92 Lock-support base plate
93 Downward-extending portion
94 Insertion through-hole
95 Rotational shaft
96 Lock member
97 Locking-claw
98 Helical torsion spring
99 Operation handle
A Contact portion
F Floor board
F1 Screw hole
F2 Positioning hole
N Weld nut
P Positioning pin

The invention claimed is:

1. A slide rail device for a vehicle comprising:
a lower rail which is fixed to a vehicle floor and is provided with a bottom wall, outer wall portions which extend upward from left and right edges of said bottom wall, and downward-extending portions which extend downward from inner edges of said outer wall portions and are provided away from said bottom wall, said lower rail extending in a forward/rearward direction; and
an upper rail which is supported by said lower rail to be slidable in said forward/rearward direction,
a lock device which is provided on said upper rail to move together with said upper rail, said lock device operable between a first position where relative movement of said lower rail and said upper rail is restricted and a second position where relative movement of said lower rail and said upper rail is allowed;
wherein a stopper lug is provided on said upper rail, and
wherein a slide-restriction lug is formed on a lower edge of each said downward-extending portion of said lower rail, the slide-restriction lug having a bent portion, at an angle positioned between a pair of slits, on the downward extending portion, arranged in the forward/rearward direction and the slide restriction lug extending in a downward direction towards an inner surface of the outer wall portion, and
wherein the slide-restriction lug and the stopper lug are arranged to define the moving range of the upper rail with respect to the lower rail when said lock device is operated to said second position.

2. The slide rail device for a vehicle according to claim 1, wherein said slits comprise a plurality of lock grooves arranged in the forward/rearward direction at equal-distance intervals.

3. The slide rail device for a vehicle according to claim 1, wherein said slide-restriction lug is cut and raised toward said outer wall portion facing said downward-extending portion,
wherein said stopper lug is positioned in a space between said downward-extending portion and said outer wall portion facing thereto.

4. The slide rail device for a vehicle according to claim 1, wherein said slide-restriction lug is formed at a front and at a rear of said lower rail, and wherein said stopper lug is positioned in between a front and a rear said slide-restriction lugs.

5. A slide rail device for vehicle comprising;
a lower rail which is fixed to a vehicle floor, said lower rail extending in a forward/rearward direction;
an upper rail which is supported by said lower rail to be slidable in said forward/rearward direction; and
a lock device which is provided on said upper rail to move together with said upper rail, said lock device operable between a first position where relative movement of said lower rail and said upper rail is restricted and a second position where relative movement of said lower rail and said upper rail is allowed;
wherein a stopper lug is provided on said upper rail,
wherein said lower rail is provided with a bottom wall, outer wall portions which extend upward from left and right edges of said bottom wall, and downward-extending portions which extend downward from inner edges of said outer wall portions, the lower ends of said downward-extending portions being apart from said bottom wall,
wherein a slide-restricting lug is formed on a lower end of each said downward-extending portion of said lower rail, the slide-restriction lug having a bent portion, at an angle positioned between a pair of slits, on the downward extending portion, arranged in the forward/rearward direction and the slide restriction lug extending in a downward direction towards an inner surface of the outer wall portion, and wherein said slide-restricting lug and said stopper lug are arranged to define the moving range of said upper rail with respect to said lower rail when said lock device is operated to said second position.

* * * * *